US012621638B2

(12) United States Patent　　　(10) Patent No.:　US 12,621,638 B2
Nam　　　　　　　　　　　　　　(45) Date of Patent:　　　May 5, 2026

(54) V2X COMMUNICATION METHOD AND APPARATUS USING HUMAN LANGUAGE

(71) Applicant: HL KLEMOVE CORP., Incheon (KR)

(72) Inventor: Jangwoo Nam, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 309 days.

(21) Appl. No.: 18/120,299

(22) Filed: Mar. 10, 2023

(65) Prior Publication Data

US 2023/0300578 A1　　Sep. 21, 2023

(30) Foreign Application Priority Data

Mar. 15, 2022　(KR) ........................ 10-2022-0032353

(51) Int. Cl.
　　*H04W 4/40*　　　　(2018.01)
　　*G06F 16/9032*　　(2019.01)
(52) U.S. Cl.
　　CPC ........ *H04W 4/40* (2018.02); *G06F 16/90332* (2019.01)
(58) Field of Classification Search
　　CPC ............................ H04W 4/40; G06F 16/90332
　　See application file for complete search history.

(56) References Cited

U.S. PATENT DOCUMENTS

2015/0264546 A1　　9/2015　Holtmanns et al.
2021/0125605 A1 *　4/2021　Lee ........................ G06F 40/30

2022/0051558 A1 *　2/2022　Choi ........................ H04W 4/40
2022/0198151 A1 *　6/2022　Park ........................ G06F 40/44
2022/0416974 A1　　12/2022　Liu et al.

FOREIGN PATENT DOCUMENTS

| CN | 112514425 | 3/2021 |
| CN | 113170289 | 7/2021 |
| KR | 10-2017-0053903 | 5/2017 |
| KR | 10-2020-0000155 | 1/2020 |
| WO | 2020/123823 | 6/2020 |

OTHER PUBLICATIONS

Matson et al, "A Natural Language Exchange Model for Enabling Human, Agent, Robot and Machine Interaction", 2011, IEEE (Year: 2011).*
Xie et al, "Deep Learning Enabled Semantic Communication Systems", 2021, arXIV (Year: 2021).*
Office Action dated Jul. 18, 2023 for Korean Patent Application No. 10-2022-0032353 and its English machine translation provided by the Applicant's foreign counsel.
Office Action (1st) dated Jan. 15, 2026 for Chinese Patent Application No. 202310110358.9 and its English translation from Google translate.

* cited by examiner

*Primary Examiner* — Kenneth M Dunne
(74) *Attorney, Agent, or Firm* — WOMBLE BOND DICKINSON (US) LLP

(57)　　　　　　ABSTRACT

A vehicle to everything (V2X) apparatus and a method performed therein generate a message for exchanging information with at least one external object or controlling the external object, the message having the form of human language; and transmit the generated message to an external V2X apparatus equipped in the external object.

15 Claims, 6 Drawing Sheets

(a)

(b)

(c)

V2X COMMUNICATION METHOD AND APPARATUS USING HUMAN LANGUAGE

CROSS-REFERENCE TO RELATED APPLICATION

This application claims priority under 35 U.S.C § 119 to Korean Patent Application No. 10-2022-0032353, filed in the Korean Intellectual Property Office on Mar. 15, 2022, the entire contents of which are hereby incorporated by reference.

TECHNICAL FIELD

One or more example embodiments relate to a method and apparatus for V2X communication, and more particularly, to a method and apparatus for performing V2X communication using a message in the form of human language.

BACKGROUND

The content described in this section merely provides background information on the present disclosure and does not configure the related art.

A vehicle to everything (V2X) communication is a generic term for vehicle to vehicle (V2V) communication, vehicle to infrastructure (V2I) communication, vehicle to network (V2N) communication, vehicle to pedestrian (V2P) communication, and the like.

As communication standards to implement the V2X communication, 5G, WAVE, and the like are used, and various information characteristics (language, grammar, etc.) for data methods in the communication standards are utilized.

The communication standards for the V2X communication utilize a simple data frame form or a programming language standard for fast data processing and machine-friendly processing. A vehicle and an external object that communicates with the vehicle (another vehicle, an infrastructure, a network, a pedestrian's terminal, etc.) should maintain the same communication standard or the data standard defined in the communication standard. Therefore, when the vehicle and the external object have different data standards, the V2X communication between the vehicle and the external object is not made.

For example, referring to a of FIG. 1, when vehicle A and vehicle B use the same data standard A, the V2X communication is made between the two vehicles, but when the data standard of vehicle B is updated to data standard B, the V2X communication between them is not made.

As another example, as illustrated in b of FIG. 1, the V2X communication may not be made even between vehicle C using a new data standard (data standard C) and vehicle A using the conventional data standard (data standard A). Similarly, the V2X communication may not be made between vehicle A having data standard A and facility D having data standard D.

If the V2X communication is not made between the vehicle and the external object, a problem of vehicle accident may occur or a convenience of passengers may be reduced due to characteristics of the vehicle moving at a high speed.

Performing an update to match data standards may solve some of the above problems, but since the update consumes a lot of time and money, a real-time mobility of the vehicle and a rapid implementation of the V2X communication may be deteriorated.

SUMMARY

An example embodiment provides a method and apparatus for V2X communication having high compatibility and versatility by implementing the V2X communication using a message having a language and a grammar of a human language form.

According to an aspect, there is provided a method performed in a vehicle to everything (V2X) apparatus including generating a message for exchanging information with at least one external object or controlling the external object, the message having the form of human language, and transmitting the generated message to an external V2X apparatus equipped in the external object.

According to another aspect, there is provided a method performed in a V2X apparatus including receiving a message in the form of human language from at least one external V2X apparatus, wherein the message requests information exchange with an external object equipped with the external V2X apparatus or instructs control of an object equipped with the V2X apparatus, and performing control corresponding to the received message.

According to example embodiments, since communication between objects is performed using a message in the form of human language, it is possible to implement fast and easy debugging when a failure or trouble occurs.

Further, according to example embodiments, since a user's command is directly transmitted through a message in the form of human language, it is possible to improve compatibility and versatility for V2X communication.

DETAILED DESCRIPTION

Figure 1:
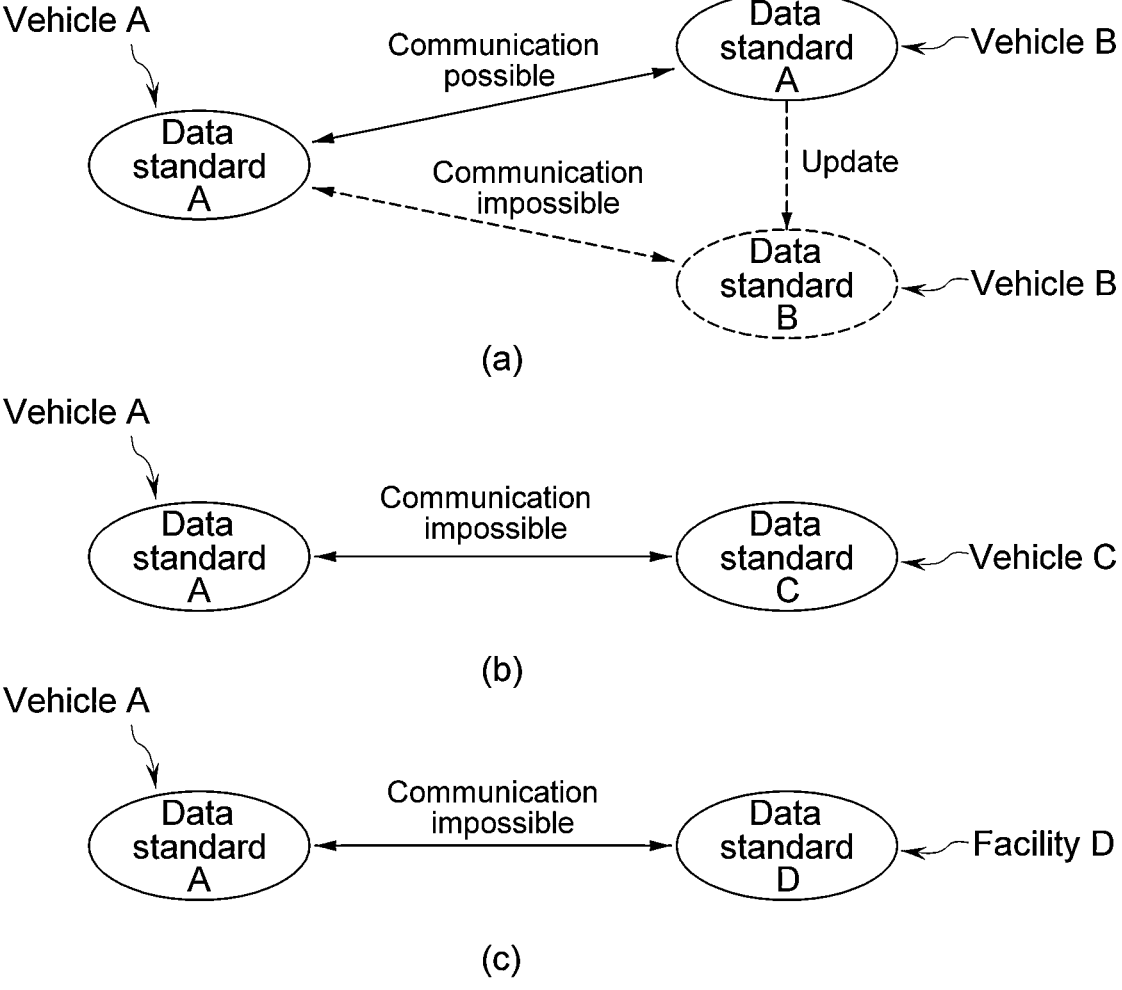
FIG. 1 is an exemplary diagram illustrating examples in which V2X communication is not made.

Hereinafter, some example embodiments will be described in detail with reference to exemplary drawings. In adding reference numerals to elements of each drawing, it should be noted that the same elements are denoted the same reference numerals as much as possible even if they are illustrated in different drawings. In addition, in describing the present disclosure, if it is determined that a detailed description of a related known configuration or function may obscure the gist of the present disclosure, the detailed description thereof will be omitted.

In addition, in describing the elements of example embodiments, terms such as first, second, A, B, (a), and (b) may be used. These terms are merely for distinguishing the elements from other elements, and the essence, order, or sequence of the elements is not limited by the terms. Throughout the present specification, when a part 'includes' or 'comprises' an element, it means that other elements may be further included, rather than excluding other elements, unless otherwise stated. In addition, terms such as 'unit' and 'module' described in the present specification mean a unit that processes at least one function or operation, which may be implemented as hardware or software or a combination of hardware and software.

A V2X communication apparatus using human language (hereinafter referred to as 'V2X apparatus') 200 may be equipped in or installed on various objects that may exchange messages or data by participating in V2X communication.

The V2X apparatus 200 may be equipped in various objects, such as an infrastructure, vehicles, networks, pedestrian terminals, such as road side unit (RSU). The objects may implement V2I communication, V2N communication, V2P communication, etc. using the V2X apparatus 200.

To distinguish the V2X apparatuses 200 equipped in different objects, it is considered that an arbitrary object (target object) and another object are located outside each other among various objects.

In other words, since the other object is located outside the target object, the other object is referred to as an 'external object', and the V2X apparatus 200 equipped in the external object is referred to as an 'external V2X apparatus 200-2'. In addition, the V2X apparatus 200 equipped in the target object is referred to as a 'V2X apparatus 200-1'.

Figure 2:
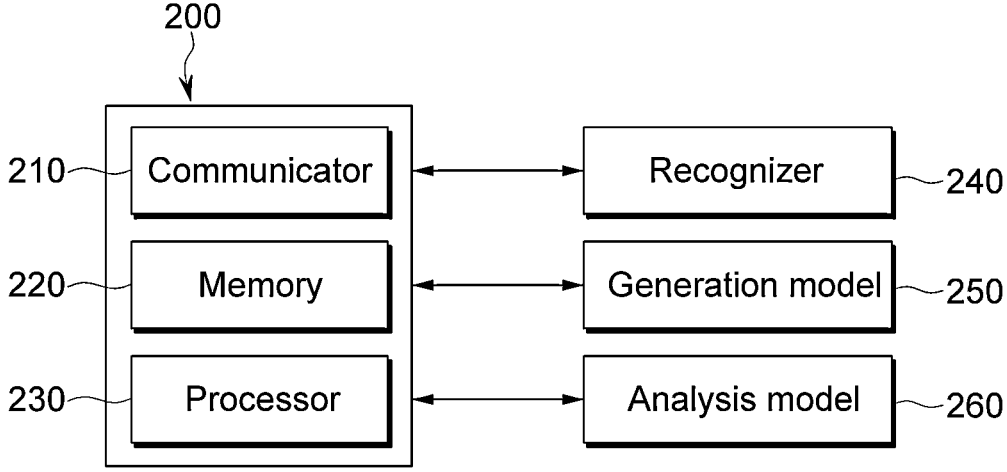
FIG. 2 is an exemplary block diagram illustrating a V2X communication apparatus using human language.

An exemplary block diagram explaining a configuration of the V2X apparatus 200 is illustrated in FIG. 2. As illustrated in FIG. 2, the V2X apparatus 200 may be configured to include a communicator 210, a memory 220, and a processor 230.

One or more programs for generating a message may be stored in the memory 220. In addition, one or more programs for analyzing a message may be stored in the memory 220.

A message is a medium for exchanging information or commands between the V2X apparatuses 200-1 and 200-2, and may be transmitted from the V2X apparatus 200-1 to the external V2X apparatus 200-2. The message may include various types of sub-messages as follows.

For example, the message may include a message for requesting an external object for external information (request message). The external information is information about surroundings or the outside of the target object, and corresponds to information that is necessary for control of the target object (for example, driving of a vehicle) or convenience of passengers but is difficult for the target object to grasp or acquire by itself.

As another example, the message may include a message that provides valid information to the external object (provision message). The valid information is information about surroundings or an outside of another object, and corresponds to information that is necessary for control of the external object (for example, driving a vehicle) but is difficult for the external object to grasp or acquire by itself.

As another example, the message may include a message for commanding or requesting specific control to the external object (command message).

One or more programs for generating a response message may be stored in the memory 220.

The response message is a medium for exchanging information or command between the V2X apparatuses 200-1 and 200-2, has information corresponding to the message, and may be transmitted from the external V2X apparatus 200-2 to the V2X apparatus 200-1. The response message may be included various types of information corresponding to a content of the message.

For example, when a message requests provision of the external information (request message), the response message may be included in the external information, and when the message provides valid information (provision message), the response message may include control result of the external object using the valid information. In addition, when the message commands control of the external object (command message), the response message may include control result of the external object according to the command.

All of the messages and the response messages may have the form of human language. In other words, the messages and the response messages may include data expressed using a grammar of the human language.

Meanwhile, the message may be generated based on a user input, a necessity for information exchange, or a necessity for control of the external object.

The user input refers to a specific control command input to a vehicle or an object by an occupant of the vehicle or a manager of the object. To execute the control command of the user input, there may be a necessity to (1) receive external information from the external object, (2) provide valid information to the external object, or (3) transmit a control command to the external object. Here, (1) and (2) correspond to the necessity of information exchange, and (3) corresponds to the necessity to control the external object.

The user input may be acquired when a recognizer 240 recognizes a user's voice. In this case, the recognizer 240 may be implemented as a voice recognition module equipped in the object. In addition, the user input may be acquired by the recognizer 240 analyzing contents indicated by a button selected by the user.

Although the recognizer 240 is expressed as being implemented outside the V2X apparatus 200 in FIG. 2, the recognizer 240 may be included as one component of the V2X apparatus 200.

Necessity for information exchange and necessity for control of the external object may occur by the user input, but the V2X apparatus 200-1 may determine by itself according to a current situation of the object.

For example, the V2X apparatus 200-1 may determine a necessity for information around the vehicle (external information) for safe driving of the vehicle by itself, or determine by itself a necessity to transmit road condition information (valid information) to another vehicle for safe driving of the other vehicle (external object) following the vehicle. In addition, when there is a need for a sudden stop due to an accident or congestion in the front of the vehicle, the V2X apparatus 200-1 may determine by itself the necessity to transmit a sudden stop control command to another vehicle following the vehicle.

The processor 230 may generate a message by executing programs stored in the memory 220. In addition, the processor 230 may analyze the message or generate a response message by executing the programs stored in the memory 220.

The communicator 210 may perform wireless communication with the external object or the external V2X apparatus 200-2. Specifically, the communicator 210 may transmit the generated message to the external V2X apparatus 200-2, and receive the response message from the external V2X apparatus 200-2.

According to an example embodiment, the processor 230 may generate the message and the response message by using a generation model 250. The generation model 250 may be pre-trained to analyze the user input, necessity of information exchange with the external object, or necessity for the external object control, and generate a message or a response message corresponding thereto.

According to an example embodiment, the processor 230 may analyze a message and a response message using an analysis model 260. The analysis model 260 may be pre-trained to analyze the message and the response message, and to identify and output content indicated by the message and the response message.

In FIG. 2, the generation model 250 and the analysis model 260 are expressed as being implemented an outside the V2X apparatus 200, but the generation model 250 and the analysis model 260 may be included as one configuration of the V2X apparatus 200. Hereinafter, various example embodiments in which the V2X apparatus 200 performs V2X communication will be described with reference to FIGS. 3 to 5.

Figure 3:
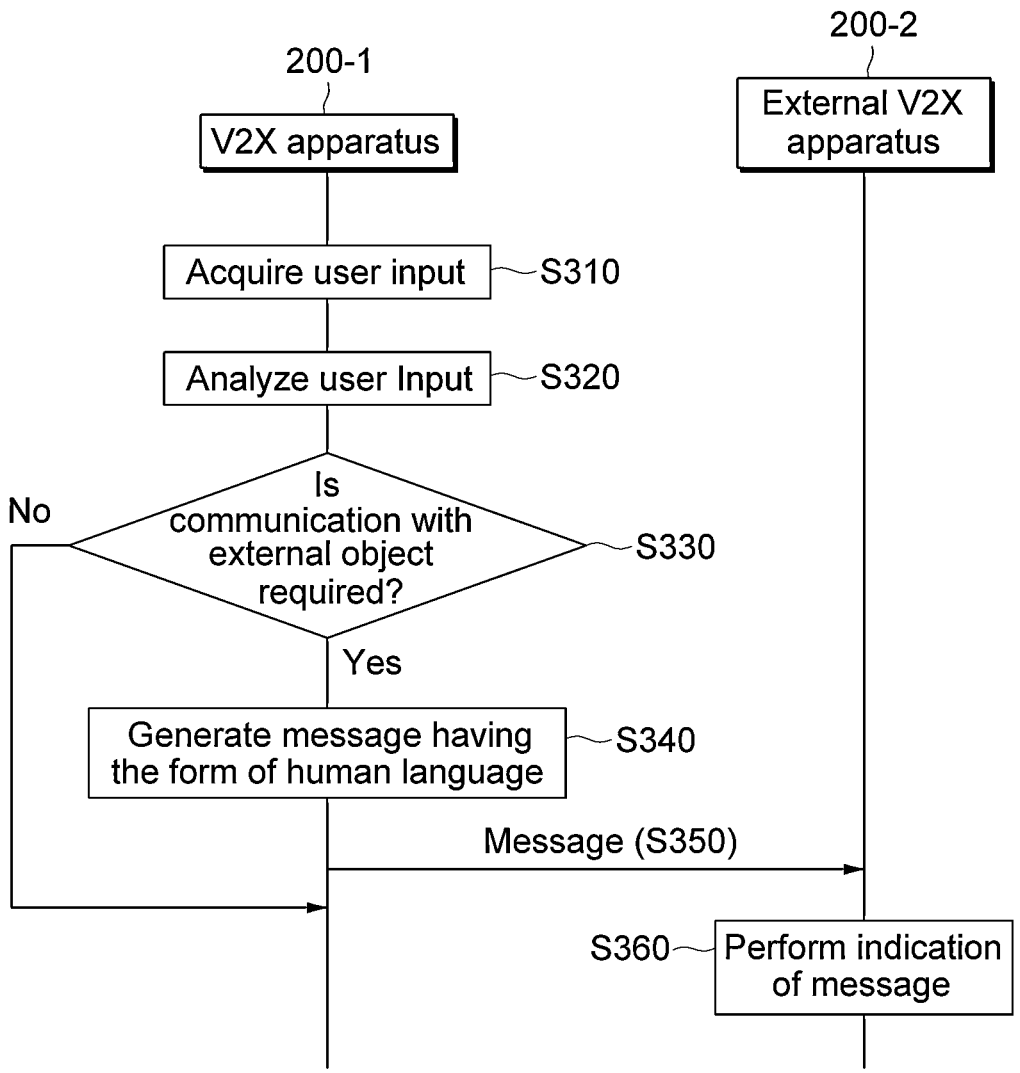
FIGS. 3 to 5 are flowcharts illustrating various example embodiments of a V2X communication method using human language.

First, an example embodiment in which the V2X apparatus 200-1 generates a message according to the user input and transmits it to the external V2X apparatus 200-2 will be described. A flowchart for explaining the example embodiment is illustrated in FIG. 3. When the recognizer 240 recognizes the user's voice or recognizes a button selected by the user, the V2X apparatus 200-1 may acquire the user input from a recognizer 240 (S310).

The V2X apparatus 200-1 may analyze a command indicated by the user input (S320), and determine whether communication with an external object is required to perform the command indicated by the user input (S330).

Here, when communication with the external object is required may be included, (1) when external information is required to perform the command indicated by the user input, (2) when provision of valid information is required to perform the command indicated by the user input, (3) when the control of the external object is required to perform the command indicated by the user input, and the like.

When it is determined that communication with the external object is required, the V2X apparatus 200-1 may generate a message (S340).

For example, the V2X apparatus 200-1 may (1) generate a request message when it is determined that the external information is necessary to perform a command indicated by the user input, (2) generate a provision message when it is determined that it is required to provide valid information to perform the command indicated by the user input, and (3) generate a command message when it is determined that it is required to control the external object to perform the command indicated by the user input. Here, the messages (request message, provision message, and command message) may be formed as a data structure in the form of human language.

The V2X apparatus 200-1 transmits the generated message to the external V2X apparatus 200-2 (S350). The external V2X apparatus 200-2 may receive the message from the V2X apparatus 200-1 and perform a subsequent operation corresponding to the message (S360).

Returning to the process S330, when it is determined that communication with the external object is not required, the V2X apparatus 200-1 collects information necessary to perform the command indicated by the user input by itself, and uses the collected information to perform the command (control according to the command is performed), and the result may be provided to the user.

Figure 4:
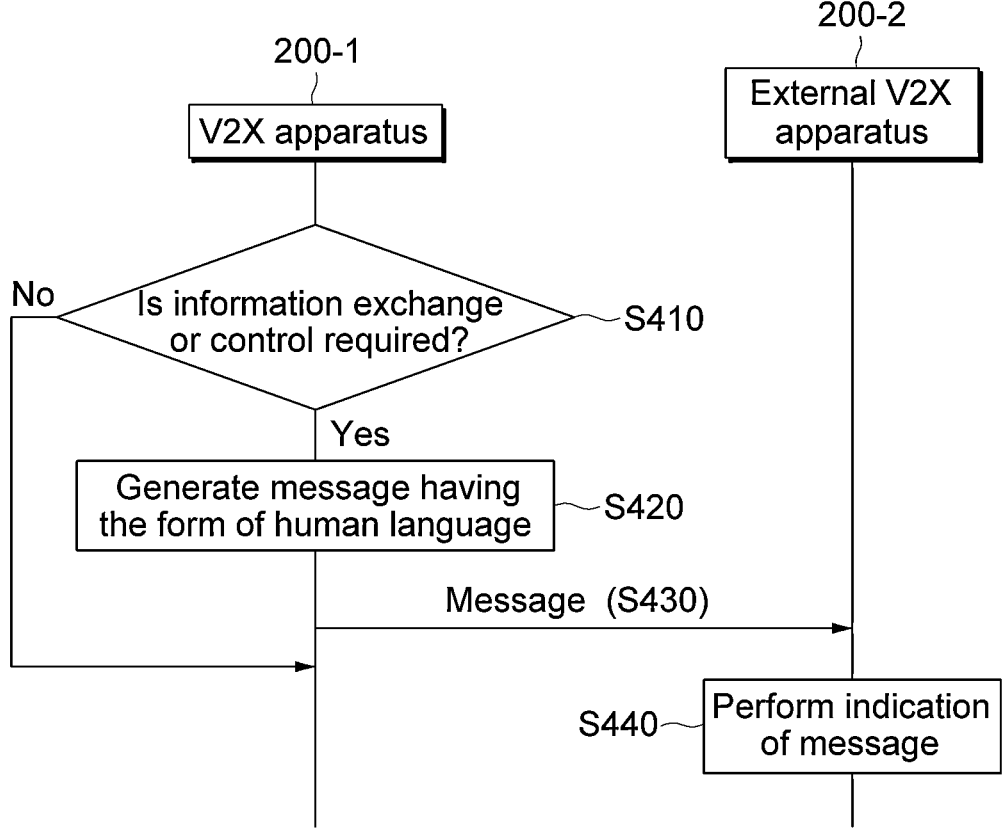

Next, an example embodiment in which the V2X apparatus 200-1 generates a message according to its own determination and transmits it to the external V2X apparatus 200-2 will be described. A flowchart for explaining the example embodiment is illustrated in FIG. 4.

The V2X apparatus 200-1 may determine by itself whether it is required to exchange information or to control an external object to perform control corresponding to a current situation of the target object (S410).

For example, when the V2X apparatus 200-1 needs information (external information) around the vehicle for safe driving, or when it is required to share road state information (valid information) with other vehicles, the V2X apparatus 200-1 may determine that information exchange is required. As another example, when the V2X apparatus 200-1 needs to stop suddenly due to an accident or congestion in front of the vehicle, or needs to control a movement of other vehicles for platooning, the V2X apparatus 200-1 may determine that control of the external object is required.

When it is determined that information exchange or control is required, the V2X apparatus 200-1 may generate a message (S420).

For example, the V2X apparatus 200-1 may (1) generate a request message when it is determined that external information is required, (2) generate a provision message when it is determined that provision of valid information is required, and (3) generate a command message when it is determined that control of the external object is required. Here, the messages (request message, provision message, and command message) may be formed as a data structure in the form of human language.

The V2X apparatus 200-1 transmits the generated message to the external V2X apparatus 200-2 (S430). The external V2X apparatus 200-2 may receive the message from the V2X apparatus 200-1 and perform a subsequent operation corresponding to the message (S440).

Returning to the process S410, when it is determined that information exchange or control is not required, the V2X apparatus 200-1 collects information necessary to perform control corresponding to a current situation of the target object by itself, uses the collected information to perform the control, and may provide result to the user.

Figure 5:
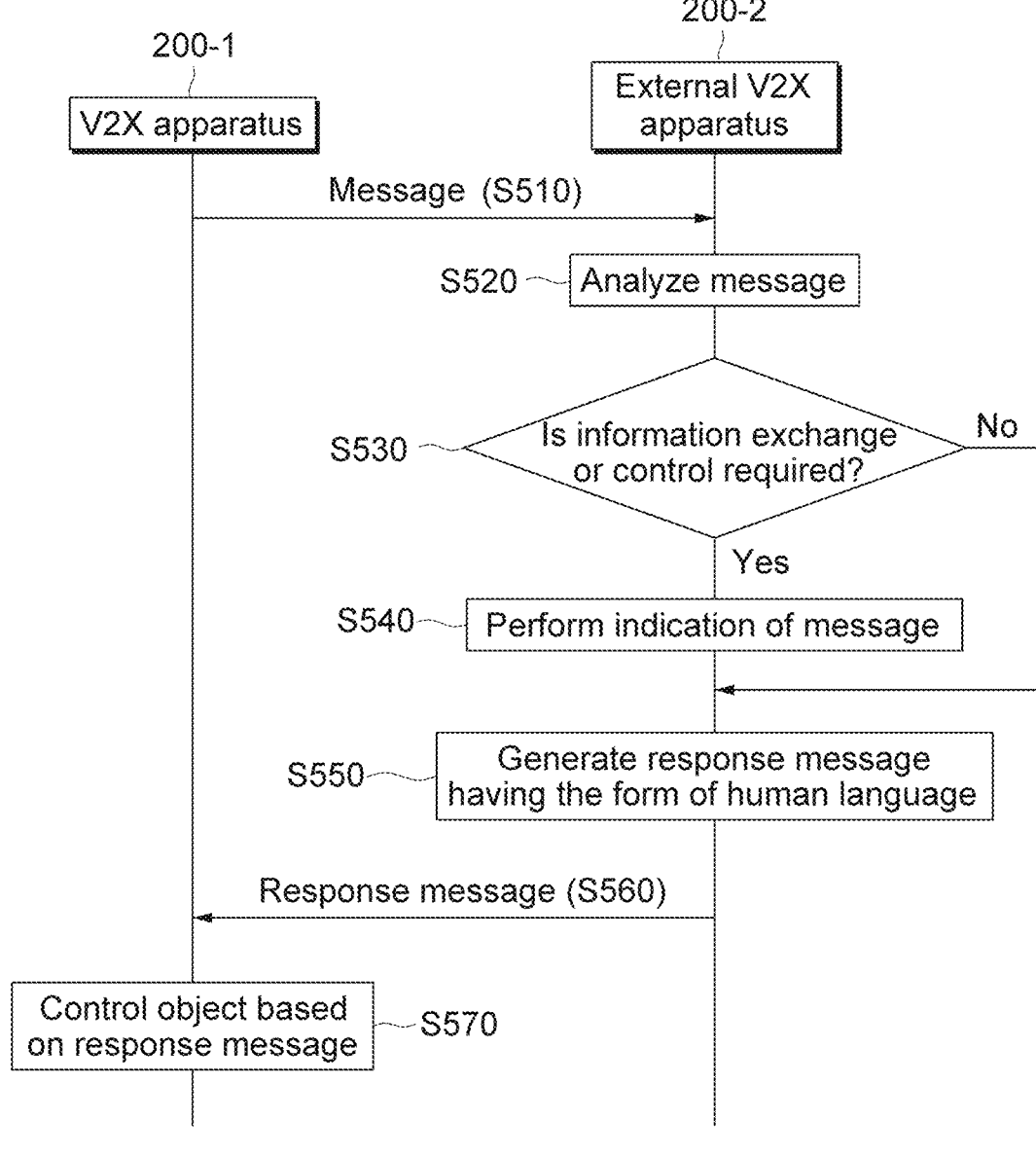

Next, an example embodiment in which the external V2X apparatus 200-2 generates a response message and transmits it to the V2X apparatus 200-1 will be described. A flowchart for explaining the example embodiment is illustrated in FIG. 5.

When a message is transmitted from the V2X apparatus 200-1 (S510), the external V2X apparatus 200-2 may analyze the message (S520). In addition, the external V2X apparatus 200-2 may perform a subsequent control corresponding to the analyzed message.

For example, when the message requests provision of external information, the external V2X apparatus 200-2 may determine whether provision of the external information is possible (S530). The external V2X apparatus 200-2 may collect the external information when it is possible to provide the external information and after generating a response message including the collected external information (S540), may transmit the response message to the V2X apparatus 200-1 (S560). Here, the response message may be formed as a data structure having the form of human language.

As another example, when the message provides valid information, the external V2X apparatus 200-2 determines whether control of the external object is possible using the valid information (S530), and if it is determined that it is possible, based on the valid information, may control an external object (S540). In addition, the external V2X apparatus 200-2 may generate a response message including a result of controlling the external object (S550), and transmit it to the V2X apparatus 200-1 (S560). Here, the response message may be formed as a data structure having the form of human language.

As another example, when the message instructs control of the external object, the external V2X apparatus 200-2 may determine whether the control of the external object is possible (S530), and if it is determined that it is possible, may control the external object according to the command indicated by the message (S540). In addition, the external V2X apparatus 200-2 may generate a response message including a result of controlling the external object (S550), and may transmit it to the V2X apparatus 200-1 (S560). Here, the response message may be formed as a data structure having the form of human language.

In the process S530, when provision of the external information is not possible or control according to the valid information or the command of the messages is not possible, the external V2X apparatus 200-2 may generate a response message indicating that it is not possible (S550) and transmit the response message to the V2X apparatus 200-1 (S560). Here, the response message may be formed as a data structure having the form of human language.

The V2X apparatus 200-1 that has received the response message from the external V2X apparatus 200-2 may instruct control of the target object based on the response message (S570).

For example, the V2X apparatus 200-1 may instruct control of the target object based on the external information included in the response message and/or the information collected by the V2X apparatus 200-1 itself.

As described above, since example embodiments perform communication between the objects using the message in the form of human language and the response message in the form of human language, a user's command may be directly transmitted through the message in the form of human language. Therefore, according to example embodiments, it is possible to improve compatibility and versatility for the V2X communication, and implement fast and easy debugging when a failure or trouble occurs.

Figure 6:
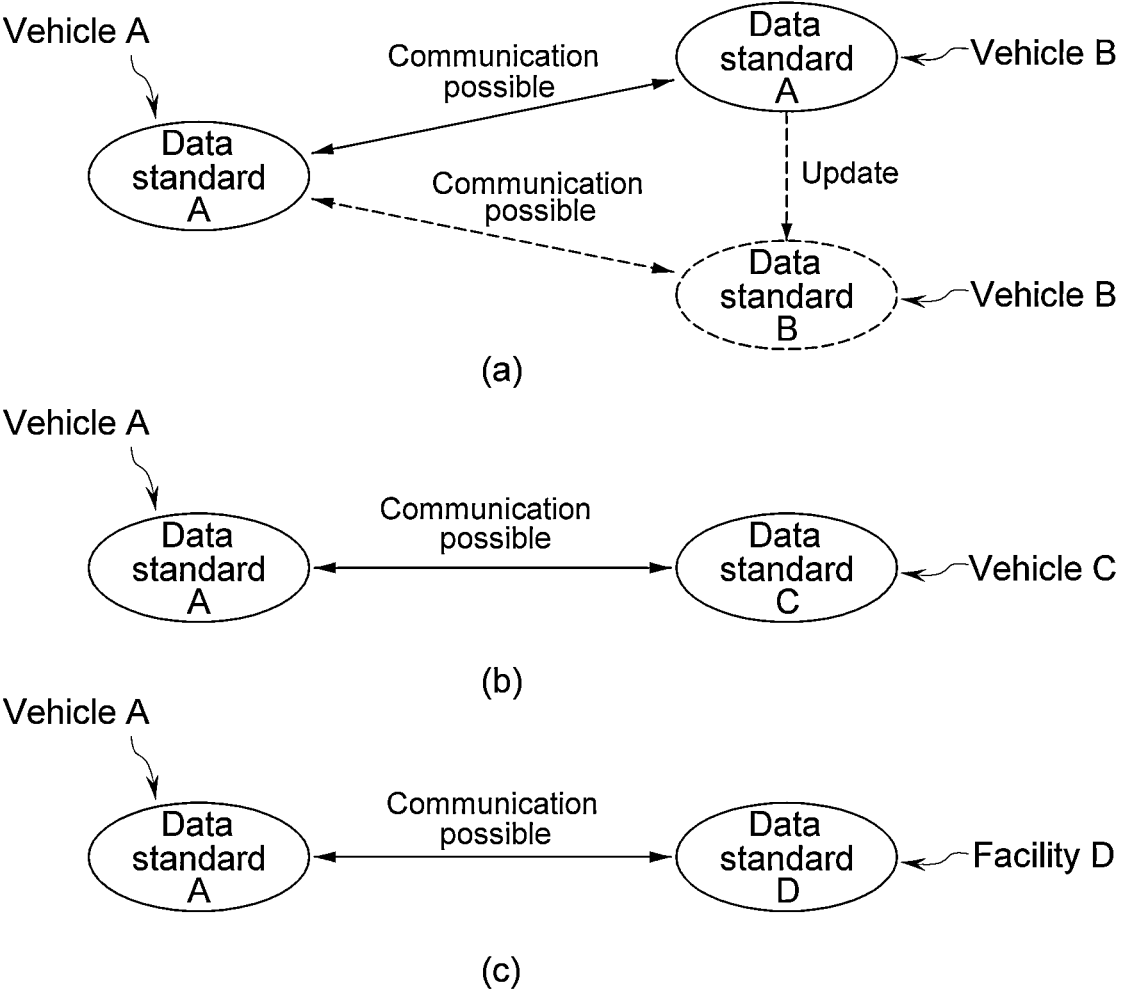
FIG. 6 is a diagram illustrating compatibility and versatility provided by example embodiments.

An example for explaining that the present disclosure may improve compatibility and versatility is illustrated in FIG. 6.

Referring to (a) of FIG. 6, when vehicle A and vehicle B use the same data standard A, the V2X communication is made between the two, and even if data standard of the vehicle B is updated to B, the V2X communication is made between the two.

As another example, as illustrated in (b) and (c) of FIG. 6, the V2X communication may be made between vehicle A having data standard A and vehicle C having data standard C, which is a new data standard, and the V2X communication may also be made between vehicle A having data standard A and facility D having data standard D.

Although it is described that each process is sequentially executed in FIGS. 3 to 5, this is merely illustrative of the technical spirit of an example embodiment of the present disclosure. In other words, various modifications and variations would be possible with changing the order described in FIGS. 3 to 5 or executing one or more processes in parallel without departing from the essential characteristics of the present disclosure by those skilled in the art to which the present invention pertains. Accordingly, FIGS. 3 to 5 are not limited to chronological order.

Meanwhile, each of processes illustrated in FIGS. 3 to 5 may be implemented as computer-readable codes on a computer-readable recording medium. The computer-readable recording medium includes all types of recording apparatuses in which data readable by a computer system is stored. In other words, the computer-readable recording medium includes storage mediums such as a magnetic storage medium (e.g. a ROM, a floppy disk, a hard disk, etc.), an optically readable medium (e.g. a CD-ROM, a DVD, etc.), and a carrier wave (e.g. transmission over Internet). In addition, the computer-readable recording medium is distributed in a network-connected computer system, so that the computer-readable code may be stored and executed in a distributed manner.

The above description is merely illustrative of the technical spirit of the present disclosure, and various modifications and variations would be possible without departing from the essential characteristics of the present disclosure by those skilled in the art to which the present disclosure pertains. Therefore, the example embodiments disclosed in the present disclosure are intended to explain the technical ideas of the example embodiments, not to limit them, and the scope of the technical ideas of the example embodiments is not limited by these example embodiments. The protection scope of the example embodiments should be construed by the following claims, and all technical ideas within the scope equivalent thereto should be construed as being included in the scope of the example embodiments.

What is claimed is:

1. A method performed in a vehicle to everything (V2X) apparatus, the method comprising:
   acquiring a user input indicated by a user's voice or a button selected by the user, by a recognizer implemented by a voice recognition module or a button equipped in the vehicle;
   analyzing, by a pre-trained analysis model implemented by a processor, command indicated by the user input;
   determining, by the processor, whether communication with an external object is required to perform the command indicated by the user input by analyzing a necessity of exchanging information with the external object or a necessity for controlling the external object;
   generating a message corresponding to an indication of the user input, by a pre-trained generation model implemented by the processor, for exchanging information with at least one external object or controlling the external object, the message having a format of natural language; and
   transmitting the generated message, by a communicator, to an external V2X apparatus equipped in the external object,
   wherein the generating comprises applying the user input to the generation model to generate the message, and
   the generation model is pre-trained to analyze the user input and generate a message in the format of the natural language corresponding thereto.

2. The method of claim 1, wherein the message comprises at least one of a request message for requesting the external object for external information, a provision message for providing valid information to the external object, and a command message for commanding control of the external object.

3. The method of claim 1, wherein the generating comprises:
   generating the request message when the external information is required to perform a command indicated by the user input;
   generating the provision message when provision of the valid information is required to perform the command indicated by the user input; and
   generating the command message when control of the external object is required to perform the command indicated by the user input.

4. The method of claim 1, further comprising:
   receiving a response message to the message from the external V2X apparatus, the response message having the format of the natural language; and instructing control of an object equipped with the V2X apparatus based on the response message.

5. A non-transitory computer-readable storage medium storing a program that, when executed by a computer, cause the computer to perform the method of claim 1.

6. A method performed in a vehicle to everything (V2X) apparatus, the method comprising:

receiving a message, by a communicator, in a format of natural language from at least one external V2X apparatus, wherein the message requests information exchange with an external object equipped with the external V2X apparatus or instructs control of an object equipped with the V2X apparatus;

analyzing an indication of the received message by a pre-trained analysis model implemented by a processor applying the received message; and performing control of a driving module associated with the object, by a processor, corresponding to the indication of the received message, wherein the external V2X apparatus is configured to:

acquire a user input indicated by a user's voice or a button selected by the user, by a recognizer implemented by a voice recognition module or a button equipped in the external object;

analyze, by a pre-trained analysis model equipped in the external object, command indicated by the user input;

determine, by the external V2X apparatus, whether communication with the object required to perform the command indicated by the user input by analyzing a necessity of exchanging information with the object or a necessity for controlling the object; and generate the message corresponding to an indication of the user input, by a pre-trained generation model equipped in the external object, for exchanging information with the object or controlling the object.

7. The method of claim 6, wherein the performing comprises:

generating a response message including external information when the message requests provision of the external information, the response message having the format of the natural language; and transmitting the generated response message to the external V2X apparatus.

8. The method of claim 6, wherein the performing comprises:

generating a response message including a result of controlling the object equipped with the V2X apparatus when the message instructs the control of the object equipped with the V2X apparatus, the response message having the format of the natural language; and transmitting the generated response message to the external V2X apparatus.

9. A vehicle to everything (V2X) apparatus comprising:

a memory configured to store one or more programs for generating a message in a format of natural language, the message being generated to exchange information with or control at least one external object;

a recognizer implemented by a voice recognition module or a button equipped in the vehicle, configured to acquire a user input indicated by a user's voice or a button selected by the user;

a processor configured to analyze command indicated by the user input using a pre-trained analysis model implemented by the processor and determine whether communication with the external object is required to perform the command indicated by the user input by analyzing a necessity of exchanging information with the external object or a necessity for controlling the external object and generate the message corresponding to an indication of the user input by inputting the user input into a pre-trained generation model implemented by the processor;

a communicator configured to transmit the generated message to an external V2X apparatus equipped in the external object; and wherein the generation model is pre-trained to analyze the user input and generate a message in the format of the natural language corresponding thereto.

10. The V2X apparatus of claim 9, wherein the message comprises at least one of a request message for requesting external information to the external object, a provision message for providing valid information to the external object, and a command message for commanding control of the external object.

11. The V2X apparatus of claim 9, wherein the processor is configured to:

generate the request message when the external information is required to perform a command indicated by the user input;

generate the provision message when provision of the valid information is required to perform the command indicated by the user input; and generate the command message when control of the external object is required to perform the command indicated by the user input.

12. The V2X apparatus of claim 9, wherein the communicator is configured to receive a response message to the message from the external V2X apparatus, the response message having the format of the natural language, and the processor is configured to instruct control of an object equipped with the V2X apparatus based on the response message.

13. A vehicle to everything (V2X) apparatus comprising:

a communicator configured to receive a message having a format of natural language from at least one external V2X apparatus, wherein the message instructs information exchange with an external object equipped with the external V2X apparatus or instructs control of an object equipped with the V2X apparatus;

a memory configured to store one or more programs for analyzing the message; and a processor configured to perform control a driving module associated with the object corresponding to an indication of the message by analyzing the indication of the received message by a pre-trained analysis model implemented by the processor applying the received message, wherein the external V2X apparatus is configured to:

acquire a user input indicated by a user's voice or a button selected by the user, by a recognizer implemented by a voice recognition module or a button equipped in the external object;

analyze, by a pre-trained analysis model equipped in the external object, command indicated by the user input;

determine, by the external V2X apparatus, whether communication with the object required to perform the command indicated by the user input by analyzing a necessity of exchanging information with the object or a necessity for controlling the object; and generate the message corresponding to an indication of the user input, by a pre-trained generation model equipped in the external object, for exchanging information with the object or controlling the object.

14. The V2X apparatus of claim 13, wherein the memory is configured to further store one or more programs for generating a response message corresponding to the message, the processor is configured to generate a response message including external information when the message requests provision of the external information, the response message having the format of the natural language, and the communicator is configured to transmit the generated response message to the external V2X apparatus.

15. The V2X apparatus of claim 13, wherein the memory is configured to further store one or more programs for generating a response message corresponding to the message, the processor is configured to generate a response message including a result of controlling the object equipped with the V2X apparatus in the case that the message instructs control of the object equipped with the V2X apparatus, the response message having the format of the natural language, and the communicator is configured to transmit the generated response message to the external V2X apparatus.

* * * * *